J. W. JARBOE.
PAPER-DISHES.
No. 7,389. Reissued Nov. 7, 1876.
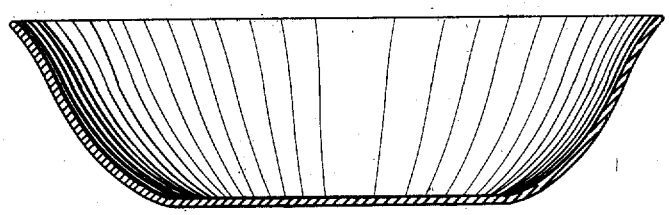
Attest
W. S. Baker
L. M. Harris
Inventor
John W. Jarboe
By Coburn & Thacher
Attorneys

UNITED STATES PATENT OFFICE.

JOHN WILLIAM JARBOE, OF GREEN POINT, NEW YORK, ASSIGNOR TO CHALMERS INGERSOLL AND HENRY F. HOBART, OF BELOIT, WIS.

IMPROVEMENT IN PAPER DISHES.

Specification forming part of Letters Patent No. 99,200, dated January 25, 1870; reissue No. 7,389, dated November 7, 1876; application filed August 8, 1876.

*To all whom it may concern:*

Be it known that I, JOHN W. JARBOE, of Green Point, in the county of Kings and State of New York, have invented a new and useful Improvement in Paper Dishes, which is fully set forth in the following specification, reference being had to the accompanying drawing, which represents a vertical or transverse section of a paper bowl constructed in accordance with my improvement.

My improvement relates to paper dishes, which may be used as substitutes for certain plain dishes of ordinary construction.

The invention consists in a dish made from finished paper-board or sheets of paper formed into the desired shape of the article. Bowls and other dish-shaped vessels have heretofore been made from paper-pulp formed or compressed in suitable dies.

This process is attended with many inconveniences and objections, not the least of which is the impossibility or difficulty of securing a uniform thickness of the pulp in spreading it, or laying it in the die or mold that gives to the article its required external form. This want of uniformity in the thickness of the pulp produces an irregularity in the article made, and is otherwise objectionable.

My improved paper dishes differ essentially from those made from paper-pulp, as above described. The paper-board and paper sheets are of uniform thickness, and therefore a dish made by forming this material into the desired shape will be of uniform thickness throughout, and will present a smooth and even surface, both internally and externally. The difficulties and objections attending the manufacture of dishes made from paper-pulp are thus effectually removed by my invention.

To produce a bowl such as is represented in the accompanying drawing, or any other dish which can be made from paper, I take finished paper-board of any suitable description, or a paper sheet of the requisite size and thickness, straw-board being preferable for many articles, and, laying it in or over a mold of the requisite form, bring down upon it a stamp or die, and strike, stamp, or press the same into the necessary shape required for the article. This may be done, if desired, without dampening the board or sheet, and after the dish has been thus produced it may be coated with any suitable water-proof solution, painted, varnished, or otherwise ornamented or treated, according to the purpose to which it is designed to put the article, or as fancy may dictate.

A dish thus made out of paper material, pressed or rolled solid into a sheet form, insures great strength and perfect uniformity of thickness in the article made; and by such method of manufacture articles of the character herein referred to may be manufactured with great regularity and dispatch.

These dishes, made from paper-board or sheets of paper, are a cheap and satisfactory substitute for dishes of ordinary construction, especially such as are of shallow form, and are adapted for all the ordinary uses for which such dishes are employed.

Having thus described my invention, what I claim as new, and desire to secure by Letters Patent, is—

As a new article of manufacture, a paper dish composed of finished paper or paper-board formed into the desired shape, substantially as and for the purpose set forth.

JOHN WILLIAM JARBOE.

Witnesses:

URIAH WELCH,
JNO. M. MORSE.